United States Patent [19]

Bishop et al.

[11] Patent Number: 5,073,253
[45] Date of Patent: Dec. 17, 1991

[54] FROTH LEVEL MEASUREMENT

[75] Inventors: Marshall D. Bishop; Lowell A. Gray, both of Bartlesville, Okla.

[73] Assignee: Phillips Petroleum Company, Bartlesville, Okla.

[21] Appl. No.: 551,595

[22] Filed: Jul. 11, 1990

[51] Int. Cl.⁵ .................. B03D 1/14; G01F 23/30
[52] U.S. Cl. ................. 209/164; 209/168; 209/169; 073/305; 073/309
[58] Field of Search ............ 73/290 V, 305, 290 R, 73/319, 320, 321, 322, 322.5, 309, 311; 181/124; 367/99, 101, 157, 908; 340/621; 200/84 R; 209/164, 168, 169

[56] References Cited

U.S. PATENT DOCUMENTS

| 2,713,263 | 7/1955 | Turner | 73/290 |
| 2,731,938 | 2/1953 | Eagon | 73/319 |
| 3,016,192 | 2/1962 | Cook | 73/320 |
| 3,057,199 | 10/1962 | Koehne | 73/321 |
| 3,208,281 | 9/1965 | Kalmus | 367/908 |
| 3,693,445 | 9/1972 | Johnson | 367/908 |
| 3,813,941 | 6/1974 | Miguel et al. | 73/322 |
| 3,834,233 | 9/1974 | Willis et al. | 367/908 |
| 3,935,741 | 2/1976 | Zinsmeyer et al. | 73/311 |
| 3,942,379 | 3/1976 | Kanzler | 73/321 |
| 4,248,088 | 2/1981 | McGown | 73/319 |
| 4,305,283 | 12/1981 | Redding | 367/908 |
| 4,537,061 | 8/1985 | DeMeyer et al. | 73/290 R |
| 4,765,186 | 8/1988 | Dieulesaint et al. | 73/290 V |
| 4,771,804 | 9/1988 | Morales | 137/412 |
| 4,876,888 | 11/1989 | Ricketts et al. | 73/319 |

FOREIGN PATENT DOCUMENTS

| 0000816 | 2/1987 | Japan | 73/290 V |
| 0118724 | 5/1989 | Japan | 73/290 V |
| 1169751 | 7/1985 | U.S.S.R. | 209/168 |
| 2152667 | 8/1985 | United Kingdom | 73/290 X |

OTHER PUBLICATIONS

Liptak, B. G., "Instrument Engineers Handbook", Process Measurements, Chilton Book Co., 1982, pp. 258-259.

Primary Examiner—William A. Cuchlinski, Jr.
Assistant Examiner—Bradley G. Bennett
Attorney, Agent, or Firm—George E. Bogatie

[57] ABSTRACT

A wire guided float level measurement system includes a float, a nozzle and an ultrasonic level detector which are attachable to an open frame. The float, which is supportable on a froth, is slideably attached to te frame via one or more guide wires, and the nozzle and ultrasonic level detector are fixed near the top of the frame. In operation the frame, with attachments, is disposed in a flotation cell in an upright position so as to traverse a froth layer which is formed in the cell. The float, while supported by the froth so as to follow the froth level, serves as a target for pulses transmitted from the ultrasonic level detector, and the detector continually measures the distance to the float which is an indirect indication of froth level. Any mineral accumulation on the float, which would interfere with its buoyancy, is washed off the top of the float by spraying wash water through one or more nozzles.

15 Claims, 3 Drawing Sheets

FROTH LEVEL MEASUREMENT

This invention relates to flotation of minerals, or other valuable constituents contained in ores. In one aspect it relates to a float type apparatus for level measurement made on a froth layer in a vessel. In another aspect it relates to an improved method for recovering valuable constituents contained in ores.

BACKGROUND OF THE INVENTION

Flotation is a process for concentrating minerals, or other valuable constituents, from their ores. In an ore flotation process the ore is crushed or wet ground to obtain a water slurry or pulp. Additives such as flotation or collecting agents and frothing agents are added to the pulp to assist in subsequent flotation steps in separating the valuable constituents from their ores. The flotation or collecting agents can comprise solid material and/or liquids such as oils, other organic compounds, or aqueous solutions.

Mineral flotation is accomplished by aerating the pulp, so that mineralized bubbles rise to the surface of the flotation cell producing a layer of froth which contains and supports pulverized mineral. The froth is then scraped or permitted to flow over the lip of the cell to effect the separation. The thus concentrated mineral bearing froth is collected and further processed to improve the concentration of desired minerals. The pulp may be further processed to recover other valuable minerals.

The equipment most commonly used in a flotation plant comprises equipment for crushing, grinding, size classification and flotation. Since the flotation residence time may vary widely, depending on the particular separation, it is usually necessary to use many flotation cells in series to allow sufficient time for all the valuable mineral to float. For example, units of 12-18 individual flotation cells are commonly used in series for copper sulfide flotation.

The froth flotation process requires the presence of a stable froth layer above the pulp for recovery of concentrated minerals. Such froth layers are generated by the use of additives known as frothers. Many designs of flotation cells, which are suitable for generating a froth layer for skimming, have been used at different times during the past 60 years. In any flotation cell, however, both pulp and froth levels are important operating variables for achieving optimum performance.

Liquid level measurement in atmospheric vessels, such as pulp level in a flotation cell, rarely presents any serious problems. Instrumentation generally can be selected and installed so that it can be removed from the vessel for calibration or repair without draining the vessel. On the other hand, various measurement techniques, such as capacitance probes, impedance probes, optical sensors and ultrasonic detectors, are known for froth or foam level measurement. None of these froth level measurement techniques, however, have proven to provide satisfactory results for level measurement of froth, which contains pulverized minerals. In particular ultrasonic level detectors, which measure the time required for an ultrasonic pulse to travel to a surface and back, are ineffective for ore flotation cells because the froth does not provide a suitable reflective surface for the ultrasonic pulses.

In view of the difficulty in measuring froth level, it is fairly common for commercial flotation plants to measure the pulp level in a flotation cell and assume that the froth level is a fixed distance above the lip of the flotation cell. While this inferred determination of froth level, based solely on pulp level, can provide satisfactory results under certain steady state conditions, it is unsatisfactory during transient conditions when any of the numerous operating variables, which may affect froth level, are changed. For example, a change in the rate of adding the frothing agent will cause a corresponding change in the froth level which cannot be inferred from the pulp level.

Accordingly, it is an object of this invention to provide method and apparatus for accurately measuring froth level in an ore flotation cell.

It is a further object of this invention to provide a wire guided float level measurement device which is suitable for use for froth level measurement in an ore flotation cell.

Another object of the invention is to provide apparatus for measuring the froth level in a flotation cell which is simple, fast, and economical.

Still another object of this invention is to improve the control of a froth layer of desired thickness for the optimum recovery of the concentrated mineral.

SUMMARY OF THE INVENTION

In accordance with the present invention apparatus and method are provided for the purpose of accurately and continuously measuring froth level in a flotation cell. To achieve this purpose, a wire guided float level measurement apparatus is provided which includes a float, supportable on a froth, and having a suitable surface for reflecting ultrasonic pulses. The apparatus further includes means for washing mineral from the reflective surface of the float. The float is positioned on the froth by a vertically disposed guide wire which is secured to a framework provided for that purpose. The framework also supports an ultrasonic level detector directly above the float for measuring the level of the float when the float is supported by the froth.

In a preferred embodiment, the wire guided float measurement apparatus comprises an open upright frame having three guide wires, the float, three spray nozzle and the ultrasonic level detector affixed thereon. The float is a generally cylindrical shape formed of aluminized polystyrene foam sold under the trademark "Styrofoam ®", and treated with a sealant material, which provides a non-permeating coating, to prevent the float from absorbing liquid or other material contained in the froth. The float is supported on the froth so as to follow variations in the actual froth level. In operation for froth level measurement, the float serves as a target for the ultrasonic level detector, and the target level is continuously measured by the ultrasonic level detector.

Further in accordance with the preferred embodiment of this invention, the upper surface of the float is shaped in the form of a dome in order to aid in washing extraneous mineral from the float's upper surface. It is desirable to keep mineral washed off the upper surface of the float because the accumulation of mineral will sink the float.

Other objects and advantages of this invention will be apparent from the foregoing brief description of the invention and the claims as well as from the detailed description of the drawings in which:

DETAILED DESCRIPTION OF THE DRAWINGS

Figure 1:
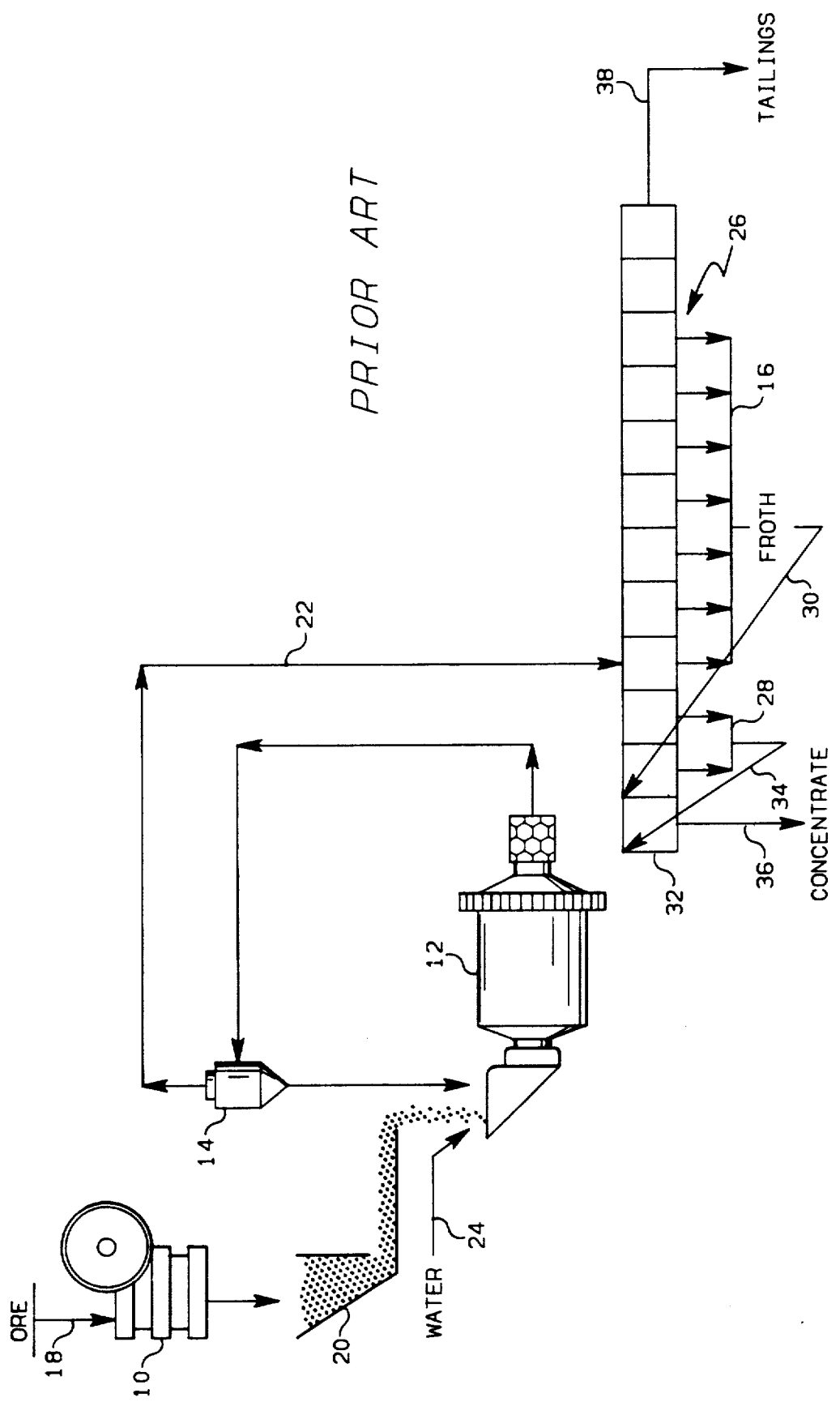
FIG. 1 is a simplified flow sheet illustrating prior art treatment of ore.

Referring now to FIG. 1, there is illustrated only the essential consecutive stages of a prior art flotation plant, comprising: an ore crusher 10, a grinder 12, a size classifier 14 and a bank of flotation cells 16. Ore is supplied to the crusher 10 via conduit 18 and crushed ore is passed to the grinder 12 via a container 20. The ore, usually ground to a nominal value of minus 65 mesh in grinder 12, is commonly gravity fed into the bank of flotation cells 16 in the form of a water slurry, or pulp, at about 25% solids by weight via conduit 22. Water may be supplied to the grinder 12 via conduit 24. Twelve flotation cells are illustrated at 26 in FIG. 1, although more or fewer cells may be employed in any particular separation.

Froth level and tailings flow in the flotation cells 26 are arranged via weirs and concentrate bearing froth is often removed by rotating paddles. The flotation cells 26 are arranged in banks. The first bank 16 is called a roughing stage, and the concentrated froth from the roughing stage 16 is passed to a cleaning stage 28 via conduit 30. From the cleaning stage 28, froth is passed to a recleaner stage 32 via conduit 34 from which the final concentrate is removed via conduit 36. The final tailings are removed via conduit 38.

The regulating, collecting and frothing agents are added either before, or by stages, to the bank of flotation cells, depending on the type of separation and the need for conditioning of the various reagents. Numerous compositions are known to be useful as additives for the beneficiation of various ores. Examples of such additives can be found for example in U.S. Pat. No. 4,372,844 issued to Bresson, et al on Feb. 8, 1983.

The ore flotation process described to this point is a conventional flotation process. For the sake of brevity only a very basic configuration has been illustrated. Also, conventional equipment not required for the explanation of this invention such as pumps, valves, control components and other typical ore flotation process equipment have not been illustrated for the sake of simplicity. For example, additional banks of flotation cells might be associated with a particular separation and, as previously indicated, level measurement instrumentation would normally be provided for the pulp level in the flotation cell. It is the manner in which the level measurement is made on the froth level that provides the novel features of this invention.

Figure 2:
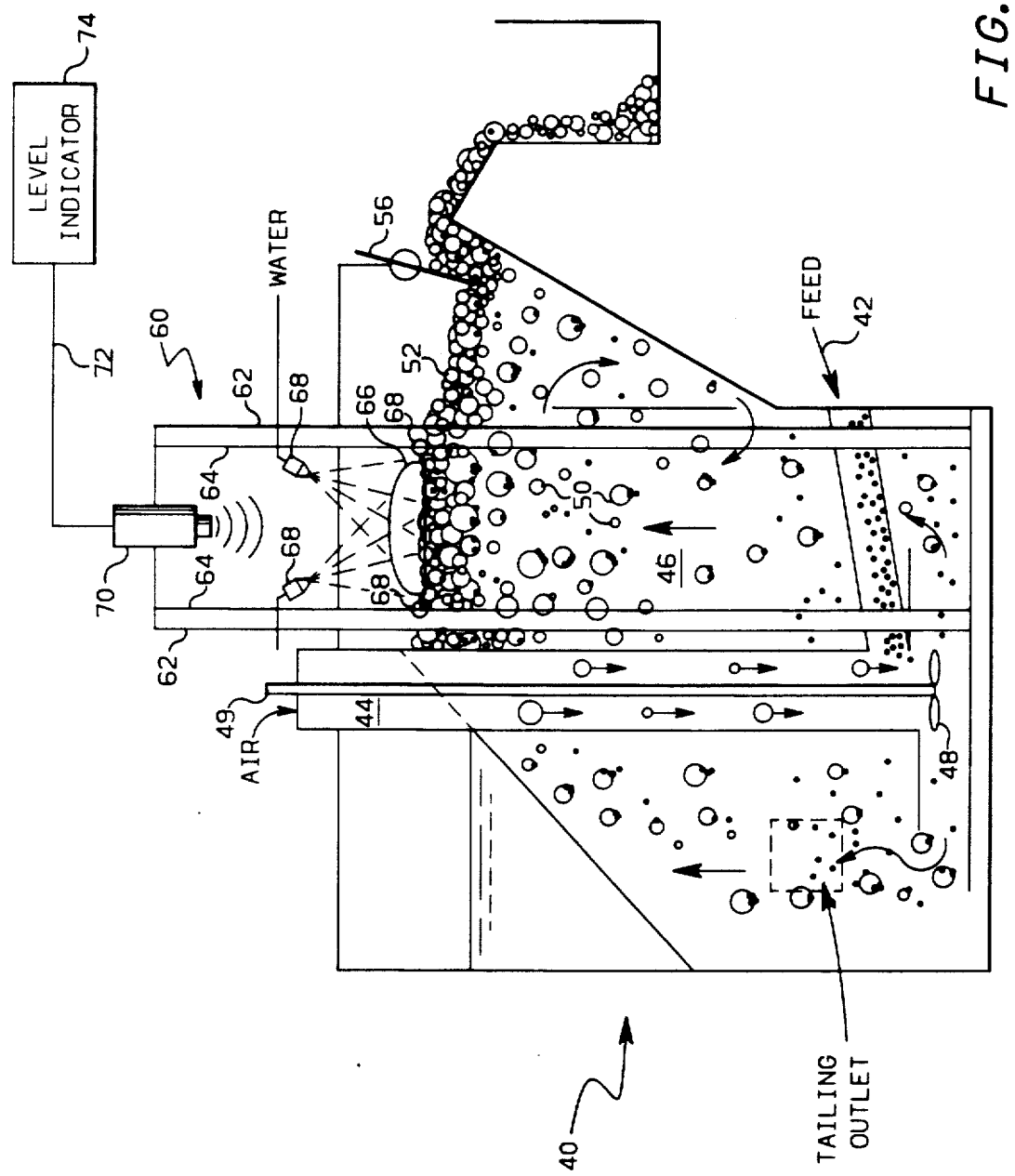
FIG. 2 is a schematic representation of a froth flotation cell having a wire guided float level measurement apparatus according to the present invention.

Referring now to FIG. 2, a schematic representation of a cell provided with a wire guided froth level measurement apparatus according to this invention, is illustrated. A commercially available flotation cell is generally indicated at 40. The feed stream to the cell 40 is a conditioned pulp supplied via conduit 42. Air is introduced through the central shaft 44 of cell 40 and is dispersed into the pulp 46 by impeller 48 which is driven through shaft 49. Mineralized bubbles 50 rise to the surface of the cell 40 to produce a froth 52, which is scraped over the lip 54 by a suitable scrapper which can be a rotating paddle 56. Cells of this type of differing designs are available commercially from various manufacturers including Denver Equipment Co., and Envirotech Corp.

A wire guided float level measurement system in accordance with this invention is generally designated by the reference character 60. The level measurement system 60 is illustrated in conjunction with an ore flotation cell 40 which, as previously indicated, is useful for concentrating minerals from their ores.

The measurement apparatus includes an upright frame 62 which is an open structure for supporting essential components of the measurement system. The frame 62 is positioned at any convenient location in the cell 40 so as to traverse the froth layer 52 which is formed in the cell 40. A pair of guide wires 64, which span the length of the frame 62 and are connected to top and bottom anchors, are provided for containing a float 66 in the central portion of the frame 62. While two guide wires are illustrated in FIG. 2, any suitable number of guide wires may be employed. Typically, one, two or three guide wires would be employed. Accordingly, the float 66 is attached to the guide wires 64. The float 66 may be attached to the guide wires 64 in any suitable manner. Eyelets 68 are illustrated in FIG. 2 for this purpose.

Any material suitable for corrosion requirements imposed by the particular froth present in the cell 40 may be selected for the frame 62, guide wires 64 and float 66. For example, the float 66 can be made of aluminum, stainless steel or other alloy; it can also be made of high strength polyester films or laminates formed into structural shapes; it can be hollow or filled with a material such as polystyrene foam sold under the trademark "Styrofoam ®". Of course, the float 66 must be of sufficient size and density so as to be supportable by the froth. The float 66 must also be disposed so as to follow rising and falling levels of the froth 52, and further provide a suitable surface for reflecting ultrasonic pulses.

In a preferred embodiment the float 66 is generally cylindrical with a slightly domed shape upper surface. The float is made of aluminized polystyrene foam sold under the trademark "Styrofoam ®" and is coated with a non-permeating sealant substance such as a Dow-Corning material known as "Silastic ®" 256. In this manner the float 66 is adapted for its intended use since aluminized polystyrene foam sold under the trademark "Styrofoam ®" is effective for reflecting sonic pulses, and the non-permeating sealant prevents absorption of liquid or other material from the froth which would affect the buoyancy of the float 66.

A water spray system for the float 66 is also provided to improve reliability of the level measurement. Spray nozzles 68, which are selected to produce a full cone round spray pattern are directed so as to wash froth from the upper domed shaped surface of the float 66. Any suitable water flow rate, which will not affect the positioning or buoyancy of the float, may be utilized.

An ultrasonic level detector 70 is mounted on the top of frame 62 as shown in FIG. 2. The detector 70 is utilized as an above-surface sensor by aiming transmitted pulses at the upper surface of the float 66. The detector 70 transmits ultrasonic pulses in air, and the time required to receive the ultrasonic reflections from the float 66 is a measure of the air depth of the space, which is an indirect indication of the froth level. In a preferred detector 70, the transmitter and receiver are packaged as a single unit. The transmitter generates short bursts of ultrasonic energy, and while the acoustic energy is being produced the receiver is blanked off. When the ultrasonic pulses are on their way, the receiver gate is open to detect the echo. The detector 70 is preferably a Model No. 9071-CP-KN35 available from Electronic Sensors, Inc., Wichita, Kans.

The output from the detector 70 is a conventional 4-20 milliamp signal which is impressed on line 72. This 4-20 milliamp signal could be transmitted to a central control computer for a froth level measurement signal and further utilized, in conjunction with a pulp level signal and a controller having a set point, for controlling froth depth by automatically manipulating the addition of the frothing agent. As illustrated in FIG. 2, however, the signal 72 is transmitted to a level indicator 74 for visual observation.

Figure 3:
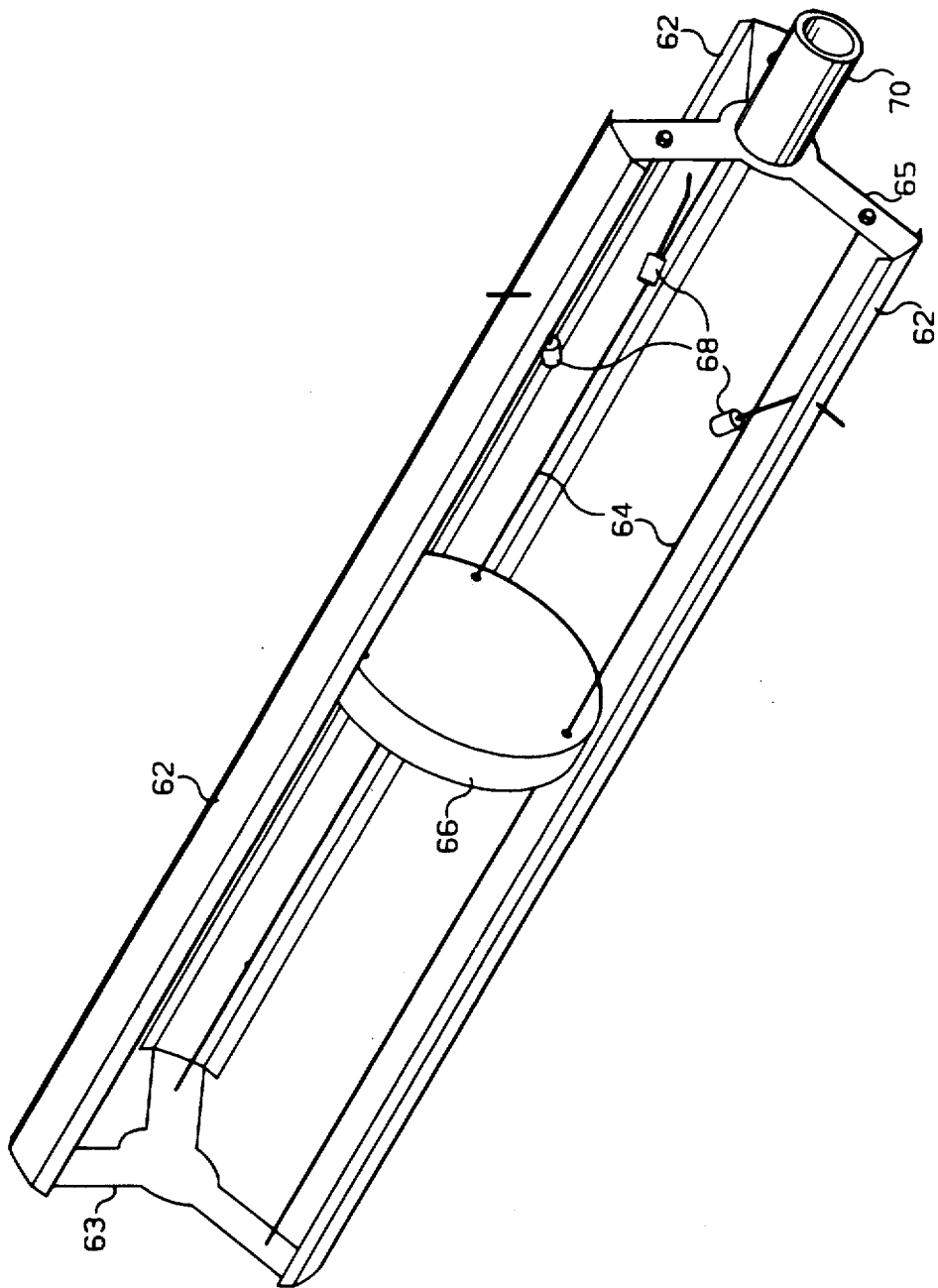
FIG. 3 is a perspective view of a wire guided float level measurement apparatus according to the present invention.

Referring now to FIG. 3, the invention is further illustrated where the same reference numerals are used for corresponding parts of the level measurement apparatus illustrated in FIG. 2. FIG. 3 is a perspective view of a prototype apparatus according to the present invention. This apparatus was successfully tested in a commercial installation. The open frame 62 comprises: a base 63, a top 65, and three vertical members 62 each of which is connected at one end to the base and at the other end at the top. Three guide wires 64 are connected to top and bottom anchors. The float 66 was provided with suitable plastic inserts through which the guide wires 64 passed. The top 65 comprises a central circular member having three equally spaced horizontally extending web members which connect to corresponding vertical members. The top further accommodates three guide wires and the ultrasonic detector 70. The nozzles were mounted at the outer end of each of the three horizontal web members. With the addition of a surrounding collar the detector 70 was mounted in the center of the top central member.

All of the frame members which includes the base, top, vertical members and guide wire were constructed of stainless steel. As previously indicated the float 66 was constructed of aluminized polystyrene foam sold under the trademark "Styrofoam ®". In the prototype apparatus illustrated in FIG. 3 an aluminum foil covered the upper surface of the float 66.

Approximate dimensions for the prototype apparatus illustrated in FIG. 3 are as follows:

| Float 66 | Frame 62 |
| --- | --- |
| diameter 10" | height 4' |
| thickness 1" | diameter 12" |
| | width of web & vertical parts 2" |

The invention has been described in terms of a preferred embodiment as illustrated in FIGS. 1-3. As has been previously stated ore flotation cells are commercially available from various manufacturers and are of differing designs. The apparatus and method of the present invention is not limited by the design details of the ore flotation cell.

While the present invention has been described in terms of the presently preferred embodiment, reasonable variations and modifications are possible by those skilled in the art. Such variations are within the scope of the described invention and the appended claims.

That which is claimed is:

1. A wire guided float level measurement apparatus comprising:
    a float, supportable on a froth, and having a suitable surface for reflecting ultrasonic pulses;
    a guide wire, vertically disposed in an upright frame, for positioning said float on said froth;
    means for washing mineral from the upper surface of said float;
    an ultrasonic level detector for measuring the level of said float when said float is supported by said froth; and
    means for supporting said ultrasonic detector directly above said float so as to aim ultrasonic pulses generated in said detector at said float.

2. Apparatus in accordance with claim 1 wherein said supporting means comprises:
    a base positionable in a flotation cell;
    a top positionable in the air above said float;
    a plurality of vertical members each of which is connected at one end to the base and connected at the other end to the top so as to form an open frame suitable for use with said flotation cell; and
    means for mounting said ultrasonic detector in said top.

3. Apparatus in accordance with claim 2, wherein said washing means comprises:
    at least one nozzle mounted in said top and pointed in a direction so as to spray said float; and
    means for supplying a liquid to said at least one nozzle.

4. Apparatus in accordance with claim 3 wherein said liquid is water.

5. Apparatus in accordance with claim 2 wherein said ultrasonic level detector comprises a single unit having a transmitter and a receiver.

6. A method of measuring the level of a froth, which comprises:
    supporting a float, having a suitable surface for reflecting ultrasonic pulses, on said froth;
    positioning said float on said froth;
    washing minerals from the upper surface of said float;
    supporting an ultrasonic level detector directly above said float; and
    aiming ultrasonic pulses generated in said level detector at said float for measuring the level of said float when said float is supported by said froth.

7. A method in accordance with claim 6 wherein said step of supporting an ultrasonic level detector comprises:
    installing an open frame in a ore flotation cell, said open frame comprising:
    a base positionable in a flotation cell;
    a top positionable in the air above said float;
    a plurality of vertical members each of which is connected at one end to the base and connected at the other end to the top so as to form said open frame suitable for use with said flotation cell; and
    means for mounting said ultrasonic detector in said top.

8. A method in accordance with claim 7 wherein said step of positioning said float on said froth comprises:
    connecting one end of a guide wire to said base and connecting the other end to said top; and
    slideable attaching said float to said guide wire.

9. A method in accordance with claim 8 wherein said ultrasonic level detector comprises a single unit having a transmitter and a receiver.

10. In a flotation process for concentrating minerals from their ores wherein the concentration is accomplished by aerating a conditioned pulp in a flotation cell so as to form a layer of froth on the pulp, and wherein said froth is skimmed from the flotation cell containing said layer of froth, the improvement comprising wire guided float level measurement apparatus, for measuring the level of said froth, which comprises:

a float, supportable on said froth, and having a suitable surface for reflecting ultrasonic pulses;

a guide wire, vertically disposed in an upright frame, for positioning said float on said froth;

means for washing mineral from the upper surface of said float;

an ultrasonic level detector for measuring the level of said float when said float is supported by said froth; and means for supporting said ultrasonic detector directly above said float so as to aim ultrasonic pulses generated in said detector at said float.

11. Apparatus in accordance with claim 10 wherein said supporting means comprises:

a base positionable in a flotation cell;

a top positionable in the air above said float;

a plurality of vertical members each of which is connected at one end to the base and connected at the other end to the top so as to form an open frame suitable for use with said flotation cell; and means for mounting said ultrasonic detector in said top.

12. Apparatus in accordance with claim 10, wherein said washing means comprises:

at least one nozzle mounted in said top and pointed in a direction so as to spray said top; and means for supplying a liquid to said at least one nozzle.

13. In a flotation process for concentrating minerals from their ores wherein the concentration is accomplished by aerating a conditioned pulp in a flotation cell so as to form a layer of froth on the pulp, and wherein said froth is skimmed from said flotation cell containing said layer of froth, the improvement comprising a method for measuring the level of said froth, which comprises:

supporting a float, having a suitable surface for reflecting ultrasonic pulses, on said froth;

positioning said float on said froth;

washing mineral from the upper surface of said float;

supporting an ultrasonic level detector directly above said float; and aiming ultrasonic pulses generated in said level detector at said float for measuring the level of said float when said float is supported by said froth.

14. A method in accordance with claim 13 wherein said step of supporting an ultrasonic level detector comprises:

installing an open frame in a ore flotation cell, said open frame comprising:

a base positionable in a flotation cell;

a top positionable in the air above said float;

a plurality of vertical members each of which is connected at one end to the base and connected at the other end to the top so as to form an open frame suitable for use with said flotation cell; and means for mounting said ultrasonic detector in said top.

15. Apparatus in accordance with claim 1 additionally comprising:

an ore flotation cell having a stable froth layer containing pulverized minerals, and wherein said float comprises a generally cylindrical component constructed of aluminized polystyrene foam.

* * * * *